(12) United States Patent
Nakazawa

(10) Patent No.: US 12,438,598 B1
(45) Date of Patent: Oct. 7, 2025

(54) SYSTEM, COMMUNICATION DEVICE, PROGRAM, AND CONTROL METHOD

(71) Applicant: SOFTBANK CORP., Tokyo (JP)

(72) Inventor: Eiji Nakazawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 394 days.

(21) Appl. No.: 17/978,969

(22) Filed: Nov. 2, 2022

Related U.S. Application Data

(63) Continuation of application No. PCT/JP2021/013151, filed on Mar. 26, 2021.

(30) Foreign Application Priority Data

May 18, 2020 (JP) .................................. 2020-087021

(51) Int. Cl.
 *H04B 7/185* (2006.01)
 *H01Q 1/28* (2006.01)
(52) U.S. Cl.
 CPC ........... *H04B 7/18504* (2013.01); *H01Q 1/28* (2013.01); *H04B 7/18506* (2013.01)
(58) Field of Classification Search
 CPC .. H04B 7/18504; H04B 7/10; H04B 7/18506; H04B 7/18508; H04B 7/18534; B64U 2101/21; B64U 2101/23; H01Q 1/246; H01Q 15/244; H04W 4/42
 See application file for complete search history.

(56) References Cited

U.S. PATENT DOCUMENTS

| | | | |
|---|---|---|---|
| 2002/0049055 A1 | 4/2002 | Matthews | |
| 2006/0189274 A1 | 8/2006 | Karabinis | |
| 2015/0381265 A1* | 12/2015 | Runyon | H01Q 1/288 |
| | | | 455/13.3 |
| 2019/0115971 A1 | 4/2019 | Tani | |
| 2019/0379117 A1* | 12/2019 | Tidhar | H01Q 15/246 |

(Continued)

FOREIGN PATENT DOCUMENTS

| | | |
|---|---|---|
| EP | 1129529 B1 | 1/2007 |
| JP | 2003509951 A | 3/2003 |
| JP | 2004080466 A | 3/2004 |

(Continued)

OTHER PUBLICATIONS

Supplementary Partial European Search Report for counterpart European Application No. 21809167.6, issued by the European Patent Office on May 7, 2024.

(Continued)

*Primary Examiner* — Khalid W Shaheed

(57) ABSTRACT

Provided is a system including: a first flying object and a second flying object each configured to be capable of establishing a wireless communication link with a ground communication device arranged on ground, in which, when replacing the first flying object which has established a wireless communication link with the ground communication device using a first circularly polarized wave with the second flying object, the first flying object cuts the wireless communication link with the ground communication device after the second flying object has established a wireless communication link with the ground communication device using a second circularly polarized wave opposite to the first circularly polarized wave.

20 Claims, 8 Drawing Sheets

(56) References Cited

U.S. PATENT DOCUMENTS

2021/0050910 A1     2/2021   Matsuura
2021/0091848 A1     3/2021   Cai

FOREIGN PATENT DOCUMENTS

| JP | 2019135823 A | 8/2019 | | |
|---|---|---|---|---|
| RU | 2733905 C2 | * | 10/2020 | ............ B64C 13/00 |
| WO | 2017199370 A1 | | 11/2017 | |
| WO | 2020054237 A1 | | 3/2020 | |

OTHER PUBLICATIONS

Arum Steve Chukwuebuka et al. A review of wireless communication using high-altitude platforms for extended coverage and capacity,Computer Communications, May 1, 2020,pp. 232-256,vol. 157,ISSN:0140-3664, DOI:10.1016/j.com.com.2020.04.20.

Kodheli Oltjon et al. Satellite Communications in the New Space Era: A Survey and Future Challenges, arxiv.org, https://arxiv.org/abs/2002.08811, Feb. 20, 2020,Cornell University Library, 201 Olin Library Cornell University Ithaca, NY 14853.

Office Action issued for counterpart Japanese Application No. 2020-087021, issued by the Japanese Patent Office on Jun. 7, 2022 (drafted on Jun. 1, 2022).

International Preliminary Report on Patentability for International Application No. PCT/JP2021/013151, issued by the International Bureau of WIPO on Nov. 17, 2022.

* cited by examiner

SYSTEM, COMMUNICATION DEVICE, PROGRAM, AND CONTROL METHOD

The contents of the following Japanese patent application(s) are incorporated herein by reference:
NO. 2020-087021 filed in JP on May 18, 2020
NO. PCT/JP2021/013151 filed in WO on Mar. 26, 2021

BACKGROUND

1. Technical Field

The present invention relates to a system, a communication device, a computer-readable storage medium, and a control method.

2. Related Art

HAPS (High Altitude Platform Station) has been known for providing a terminal with a wireless communication service by establishing a feeder link with a gateway on the ground, establishing a service link with a terminal on the ground, and relaying communication between the gateway and the terminal (see, for example, Patent Document 1).

PRIOR ART DOCUMENT

Patent Document

Patent Document 1: Japanese Patent Application Publication No. 2019-135823

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solving means of the invention.

Figure 1:
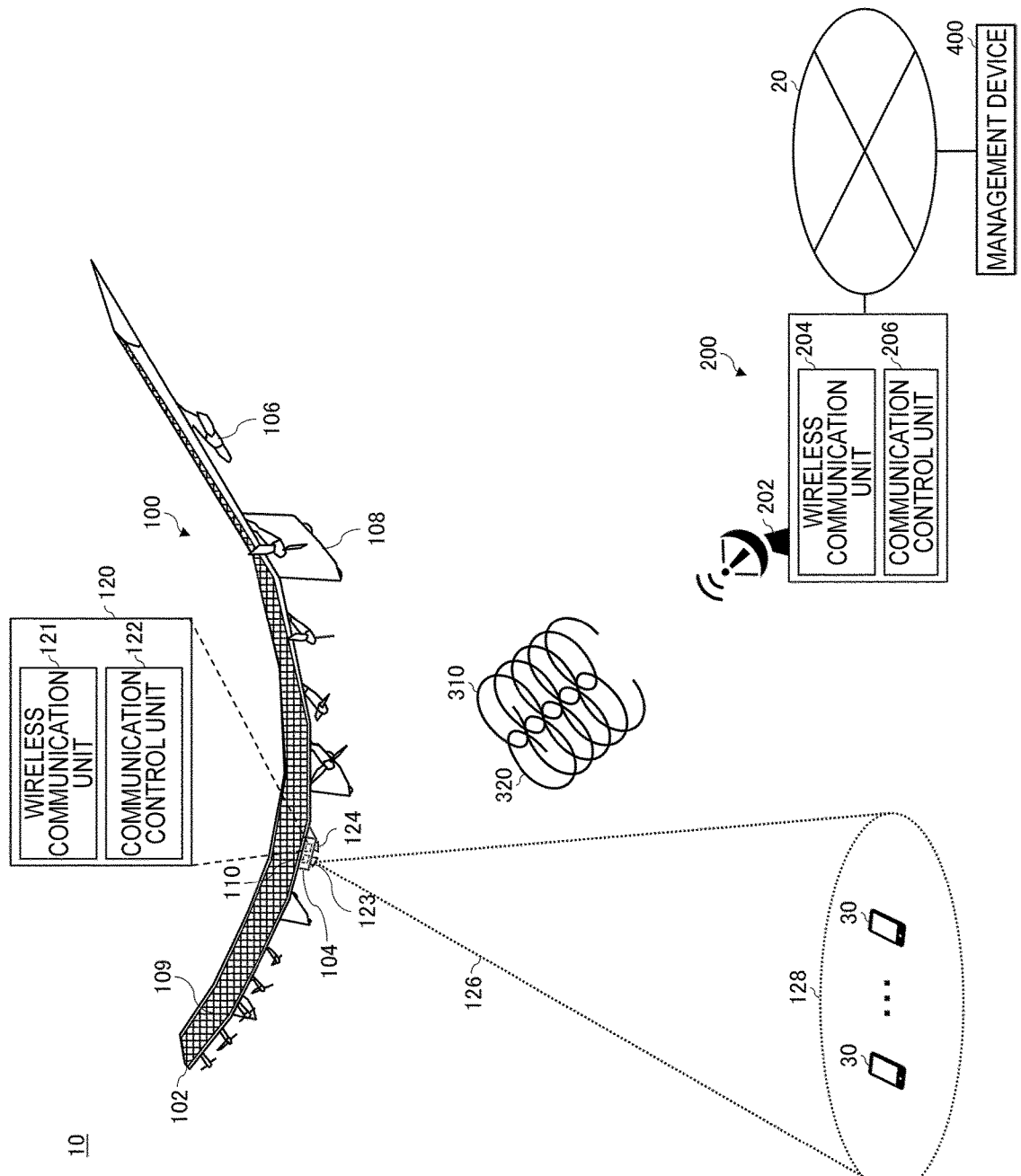
FIG. 1 schematically illustrates an example of a system 10.

FIG. 1 schematically illustrates an example of a system 10. The system 10 includes a HAPS 100. The system 10 may include a plurality of HAPSs 100. The HAPS 100 may be an example of a flying object. The HAPS 100 may further include a ground communication device 200.

The HAPS 100 includes a fuselage 102, a central part 104, a propeller 106, a pod 108, and a solar panel 109. A flight control device 110 and a communication control device 120 are arranged inside the central part 104. The flight control device 110 and the communication control device 120 may be separate devices, or may be integrated.

Electrical power generated by the solar panel 109 is stored in one or more batteries arranged in at least any of the fuselage 102, the central part 104, or the pod 108. The electrical power stored in the battery is utilized by each component included in the HAPS 100.

The flight control device 110 controls a flight of the HAPS 100. The flight control device 110 controls the flight of the HAPS 100 by controlling a rotation of the propeller 106, for example. Also, the flight control device 110 may control the flight of the HAPS 100 by changing an angle of a flap or an elevator which are not shown. The flight control device 110 may include various sensors such as a positioning sensor including a GPS sensor and the like, a gyro sensor, and an acceleration sensor, to manage the position, the moving direction, and the moving speed of the HAPS 100.

The communication control device 120 controls communication of the HAPS 100. The communication control device 120 uses an SL (Service Link) antenna 123 to irradiate beams 126 toward a target area on the ground and form a wireless communication area 128 in the target area. The communication control device 120 forms a service link with a user terminal 30 on the ground using the SL antenna 123. The SL antenna 123 may be a multi-beam antenna. The wireless communication area 128 may be multicellular.

The communication control device 120 may use an FL (Feeder Link) antenna 124 to form a feeder link with the ground communication device 200 arranged on the ground. The feeder link may be an example of a wireless communication link. The communication control device 120 may access a network 20 via the ground communication device 200.

The network 20 includes a mobile communication network. The mobile communication network may comply with any of a 3G (3rd Generation) communication system, an LTE (Long Term Evolution) communication system, a 5G (5th Generation) communication system, or a 6G (6th Generation) communication system and subsequent communication systems. The network 20 may include the Internet.

The communication control device 120 may manage the battery mounted on the HAPS 100. The communication control device 120 manages a remaining battery amount of the battery, for example. Further, for example, the communication control device 120 manages power consumption of the battery. For example, the communication control device 120 manages the power consumption of the battery for each predetermined time. Further, for example, the communication control device 120 manages a generated electrical power amount of the solar panel 109.

The user terminal 30 may be any communication terminal as long as it is capable of communicating with the HAPS 100. For example, the user terminal 30 is a mobile phone such as a smartphone. The user terminal 30 may be a tablet terminal, a PC (Personal Computer), and the like. The user terminal 30 may also be a so-called IoT (Internet of Thing) device. The user terminal 30 may include all things corresponding to a so-called IoE (Internet of Everything).

For example, the HAPS 100 relays communication between the network 20 and the user terminal 30 via the feeder link and the service link. The HAPS 100 may provide the user terminal 30 with a wireless communication service by relaying the communication between the user terminal 30 and the network 20.

For example, the HAPS 100 transmits data received from the user terminal 30 in the wireless communication area 128 to the network 20. Moreover, for example, when data addressed to the user terminal 30 in the wireless communication area 128 is received via the network 20, the HAPS 100 transmits the data to the user terminal 30.

The communication control device 120 may manage a communication status of the user terminal 30 in the wireless communication area 128. For example, the communication control device 120 manages a communication traffic volume of the user terminal 30 in the wireless communication area 128.

A management device 400 manages the plurality of HAPSs 100. The management device 400 may communicate with the HAPSs 100 via the network 20 and the ground communication device 200.

The management device 400 controls the HAPSs 100 by transmitting instructions. The management device 400 may cause the HAPS 100 to circle in a sky above the target area so that the communication area 128 covers the target area on the ground. For example, while flying in a circular orbit in the sky above the target area, the HAPS 100 maintains the feeder link with the ground communication device 200 by adjusting an orientation direction of the FL antenna, and maintains coverage of the target area by the communication area 128 by adjusting an orientation direction of the SL antenna.

The HAPS 100 and the ground communication device 200 according to the present embodiment are capable of executing wireless communication that uses circularly polarized waves. In the HAPS 100 and the ground communication device 200, both the transmission and reception are performed through double-polarized communication, for example. In the HAPS 100 and the ground communication device 200, the transmission from the HAPS 100 to the ground communication device 200 may be performed through double-polarized communication, and the transmission from the ground communication device 200 to the HAPS 100 may be performed through single-polarized communication. Alternatively, in the HAPS 100 and the ground communication device 200, the transmission from the HAPS 100 to the ground communication device 200 may be performed through single-polarized communication, and the transmission from the ground communication device 200 to the HAPS 100 may be performed through double-polarized communication. In the HAPS 100 and the ground communication device 200, both the transmission and reception may be performed through single-polarized communication.

The communication control device 120 includes a wireless communication unit 121 that wirelessly communicates with the ground communication device 200 using the FL antenna 124, and a communication control unit 122 that controls the wireless communication unit 121. The communication control unit 122 may cause the wireless communication unit 121 to make a switch between the double-polarized communication that uses a right-handed circularly polarized wave and a left-handed circularly polarized wave and the single-polarized communication that uses the right-handed circularly polarized wave or the left-handed circularly polarized wave, according to a predetermined condition.

For example, the communication control unit 122 causes the transmission system with respect to the ground communication device 200 to be switched based on a remaining battery amount of the battery mounted on the HAPS 100. For example, the communication control unit 122 causes the wireless communication unit 121 to execute the double-polarized communication when the remaining battery amount is larger than a predetermined threshold, and execute the single-polarized communication when the remaining battery amount is smaller than the threshold. Accordingly, when the remaining battery amount is large, the double-polarized communication can be set so as to increase a communicable capacity, and when the remaining battery amount is small, the single-polarized communication can be set so as to reduce battery consumption.

Further, for example, the communication control unit 122 causes the transmission system with respect to the ground communication device 200 to be switched based on power consumption of the battery mounted on the HAPS 100. For example, the communication control unit 122 causes the wireless communication unit 121 to execute the double-polarized communication when the power consumption is smaller than a predetermined threshold, and execute the single-polarized communication when the power consumption is larger than the threshold. Accordingly, for example, when a large amount of electrical power is required for flight control, the electrical power amount required for the communication can be reduced by switching from the double-polarized communication to the single-polarized communication.

Alternatively, for example, the communication control unit 122 causes the transmission system with respect to the ground communication device 200 to be switched based on a generated electrical power amount of the solar panel 109. For example, the communication control unit 122 causes the wireless communication unit 121 to execute the double-polarized communication when the generated electrical power amount is larger than a predetermined threshold, and execute the single-polarized communication when the generated electrical power amount is smaller than the threshold. Accordingly, when the generated electrical power amount is sufficient, the double-polarized communication can be set so as to increase the communicable capacity, and when the generated electrical power amount is insufficient, the single-polarized communication can be set so as to reduce the electrical power consumption.

Alternatively, for example, the communication control unit 122 causes the transmission system with respect to the ground communication device 200 to be switched based on a communication traffic volume of the user terminal 30 in the wireless communication area 128. For example, the communication control unit 122 causes the wireless communication unit 121 to execute the double-polarized communication when the communication traffic volume is larger than a predetermined threshold, and execute the single-polarized communication when the communication traffic volume is smaller than the threshold. Accordingly, when the communication traffic volume is large, the double-polarized communication can be used so as to increase the communication capacity.

The ground communication device 200 includes an antenna 202, a wireless communication unit 204, and a communication control unit 206. The antenna 202 may be an antenna capable of transmitting and receiving the right-handed circularly polarized wave and the left-handed circularly polarized wave.

The wireless communication unit 204 is capable of establishing a wireless communication link with the HAPS 100. The communication control unit 206 may control the wireless communication unit 204. For example, the communication control unit 206 causes the wireless communication unit 204 to make a switch between the double-polarized communication that uses the right-handed circularly polarized wave and the left-handed circularly polarized wave and the single-polarized communication that uses the right-handed circularly polarized wave or the left-handed circularly polarized wave. The communication control unit 206 may cause the wireless communication unit 204 to make a switch between the double-polarized communication and the single-polarized communication by exchanging instructions and the like with the communication control unit 122.

As exemplified in FIG. 1, according to the system 10 of the present embodiment, the double-polarized communication that uses the right-handed circularly polarized wave and the left-handed circularly polarized wave and the single-polarized communication that uses the right-handed circularly polarized wave or the left-handed circularly polarized wave can be performed between the HAPS 100 and the ground communication device 200. By enabling the double-polarized communication to be performed, a capacity of the feeder link can be increased as compared to a case where the circularly polarized wave is not used. Further, by enabling each of the right-handed circularly polarized wave and the left-handed circularly polarized wave to be used, for example, an operation in which either one of them is used in normal times but is switched to the other when a defect such as a failure occurs, or the like becomes possible.

Figure 2:
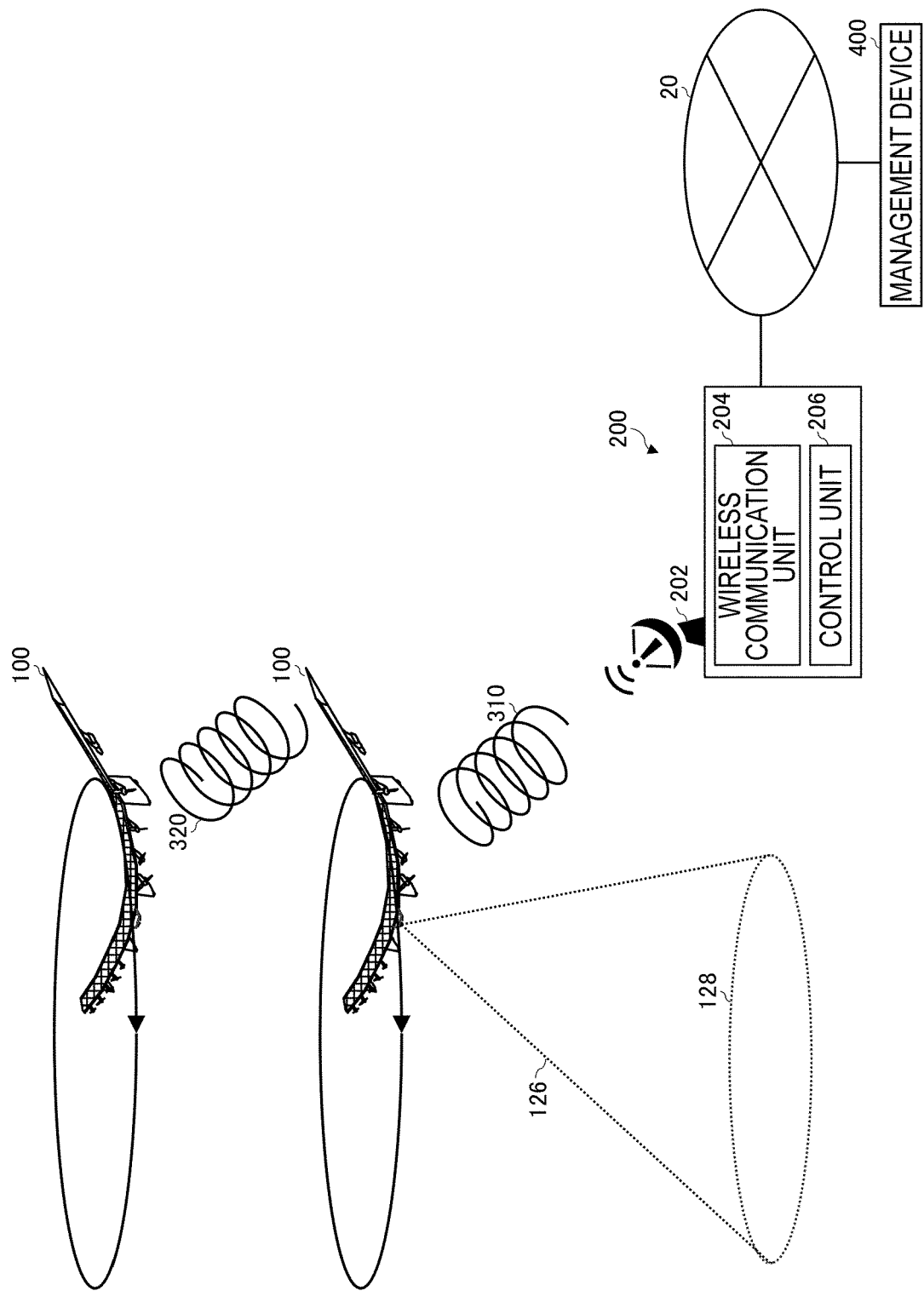
FIG. 2 is an explanatory diagram for describing a replacement of a first HAPS 100 and a second HAPS 100.

FIG. 2 is an explanatory diagram for describing a replacement of a first HAPS 100 and a second HAPS 100. The first HAPS 100 is an active aircraft that is currently forming the communication area 128 on the ground and providing the user terminal 30 with a wireless communication service, and the second HAPS 100 is a spare aircraft. The second HAPS 100 replaces the first HAPS 100 in forming a wireless communication area in a target area. For example, the first HAPS 100 forms the wireless communication area 128 in the target area while circling in the sky above the target area, and the second HAPS 100 establishes a feeder link with the ground communication device 200 while flying in a flight area corresponding to a flight area of the first HAPS 100. FIG. 2 exemplifies a case where the flight area of the second HAPS 100 is above the flight area of the first HAPS 100. The second HAPS 100 may fly in an orbit similar to that of the first HAPS 100.

When replacing the first HAPS 100 which has established a wireless communication link with the ground communication device 200 using a first circularly polarized wave with the second HAPS 100, the first HAPS 100 cuts the wireless communication link with the ground communication device 200 after the second HAPS 100 establishes a wireless communication link with the ground communication device 200 using a second circularly polarized wave opposite to the first circularly polarized wave. In the example shown in FIG. 2, when replacing the first HAPS 100 which has established a feeder link with the ground communication device 200 using a right-handed circularly polarized wave 310 with the second HAPS 100, the first HAPS 100 cuts the wireless communication link with the ground communication device 200 after the second HAPS 100 establishes a feeder link with the network 20 using a left-handed circularly polarized wave 320. After the cutting, the first HAPS 100 returns to the ground, for example.

When replacing the first HAPS 100 with the second HAPS 100, the ground communication device 200 may transmit information with respect to the first HAPS 100 using the right-handed circularly polarized wave 310, and transmit information with respect to the second HAPS 100 using the left-handed circularly polarized wave 320. The first HAPS 100 may receive the right-handed circularly polarized wave 310 and the left-handed circularly polarized wave 320 transmitted by the ground communication device 200, to thus acquire the information with respect to the first HAPS 100 from the right-handed circularly polarized wave 310. The second HAPS 100 may receive the right-handed circularly polarized wave 310 and the left-handed circularly polarized wave 320 transmitted by the ground communication device 200, to thus acquire the information with respect to the second HAPS 100 from the left-handed circularly polarized wave 320.

When replacing the first HAPS 100 with the second HAPS 100, the ground communication device 200 may receive the right-handed circularly polarized wave 310 transmitted by the first HAPS 100 and the left-handed circularly polarized wave 320 transmitted by the second HAPS 100, to acquire information from the first HAPS 100 from the right-handed circularly polarized wave 310 and acquire information from the second HAPS 100 from the left-handed circularly polarized wave 320.

It is to be noted that the first HAPS 100 may use the left-handed circularly polarized wave 320, and the second HAPS 100 may use the right-handed circularly polarized wave 310.

When replacing the first HAPS 100 with the second HAPS 100, it is desirable that an instantaneous interruption can be prevented from occurring in the wireless communication service due to the break up of the feeder link. To prevent such an instantaneous interruption from occurring, a method of physically dividing a bandwidth of the feeder link between the ground communication device 200 and the HAPSs 100 so that the two devices can be simultaneously connected to be switched is being discussed, but there arises a problem that a communication capacity falls during the fuselage replacement.

In the system 10 according to the present embodiment, by using the circularly polarized waves having different circular polarization directions within the same bandwidth for the active aircraft and the spare aircraft, both fuselages can be simultaneously connected to the ground communication device 200 when switching the feeder link. After that, by performing an accumulation in a buffer in a baseband signal band and an adjustment of switching timings in the ground communication device 200, uninterrupted switching can be realized. Owing to the simultaneous connection with the ground communication device 200 while avoiding an interference by using different polarized waves in the same bandwidth without dividing the bandwidth, the fall of the communication capacity during the fuselage replacement can be suppressed.

The example of performing the switching in a state where the second HAPS 100 is flying above the first HAPS 100 has been described with reference to FIG. 2. In this case, since transmission points of the first HAPS 100 and the second HAPS 100 differ, losses may be caused due to a deviation of a center axis of one of the transmission points (axial ratio deterioration/polarization unconformity). The system 10 may adopt, for example, a polarization correction OMT (OrthoMode Transducer) to correct such a deviation.

Further, the ground communication device 200 may include two antennas 202. The ground communication device 200 may communicate with the first HAPS 100 using one of the two antennas 202, and communicate with the second HAPS 100 using the other one of the two antennas 202. Accordingly, the two antennas 202 can be oriented toward the first HAPS 100 and the second HAPS 100, respectively, so that the occurrence of a deviation can be suppressed. In addition, the antenna 202 may be a diversity antenna.

Further, the second HAPS 100 may be positioned on a straight line connecting the first HAPS 100 and the ground communication device 200. For example, the second HAPS 100 can acquire position information of the first HAPS 100 and the ground communication device 200 from the management device 400 or the like, and move to a position on the straight line connecting the first HAPS 100 and the ground communication device 200. Accordingly, the deviation can be reduced, and losses can be suppressed.

Figure 3:
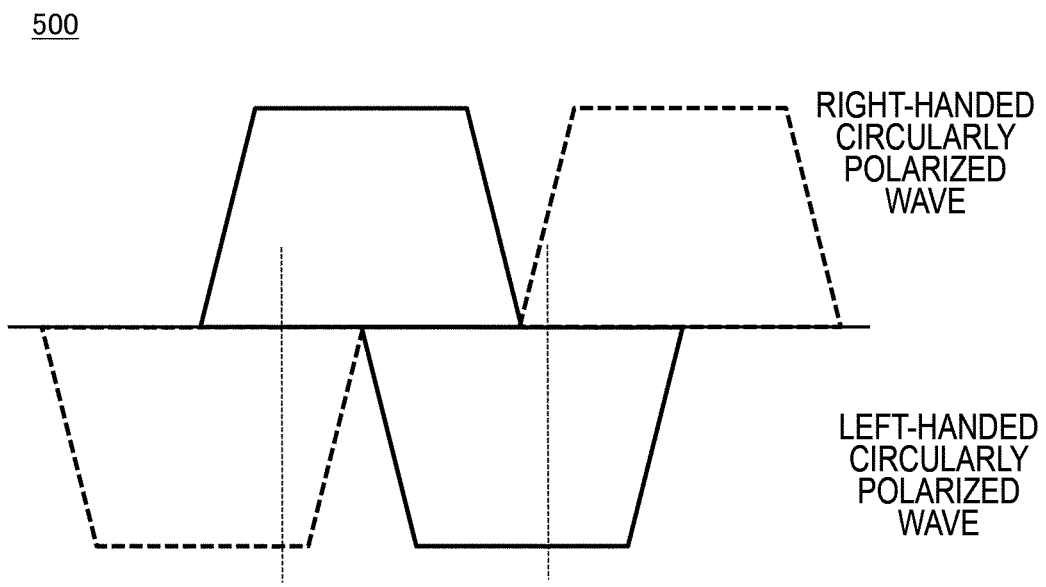
FIG. 3 schematically illustrates an example of an allocated frequency 500.

FIG. 3 schematically illustrates an example of an allocated frequency 500 of the right-handed circularly polarized wave and the left-handed circularly polarized wave. As exemplified in FIG. 3, in the system 10, the right-handed circularly polarized wave and the left-handed circularly polarized wave shifted by a half cycle may be used. By shifting by a half cycle, an effect on the other when going around the back can be suppressed. It is to be noted that the allocated frequency 500 shown in FIG. 3 is a mere example, and other allocations may be adopted as long as the frequency of the right-handed circularly polarized wave and the frequency of the left-handed circularly polarized wave at least partially overlap.

Figure 4:
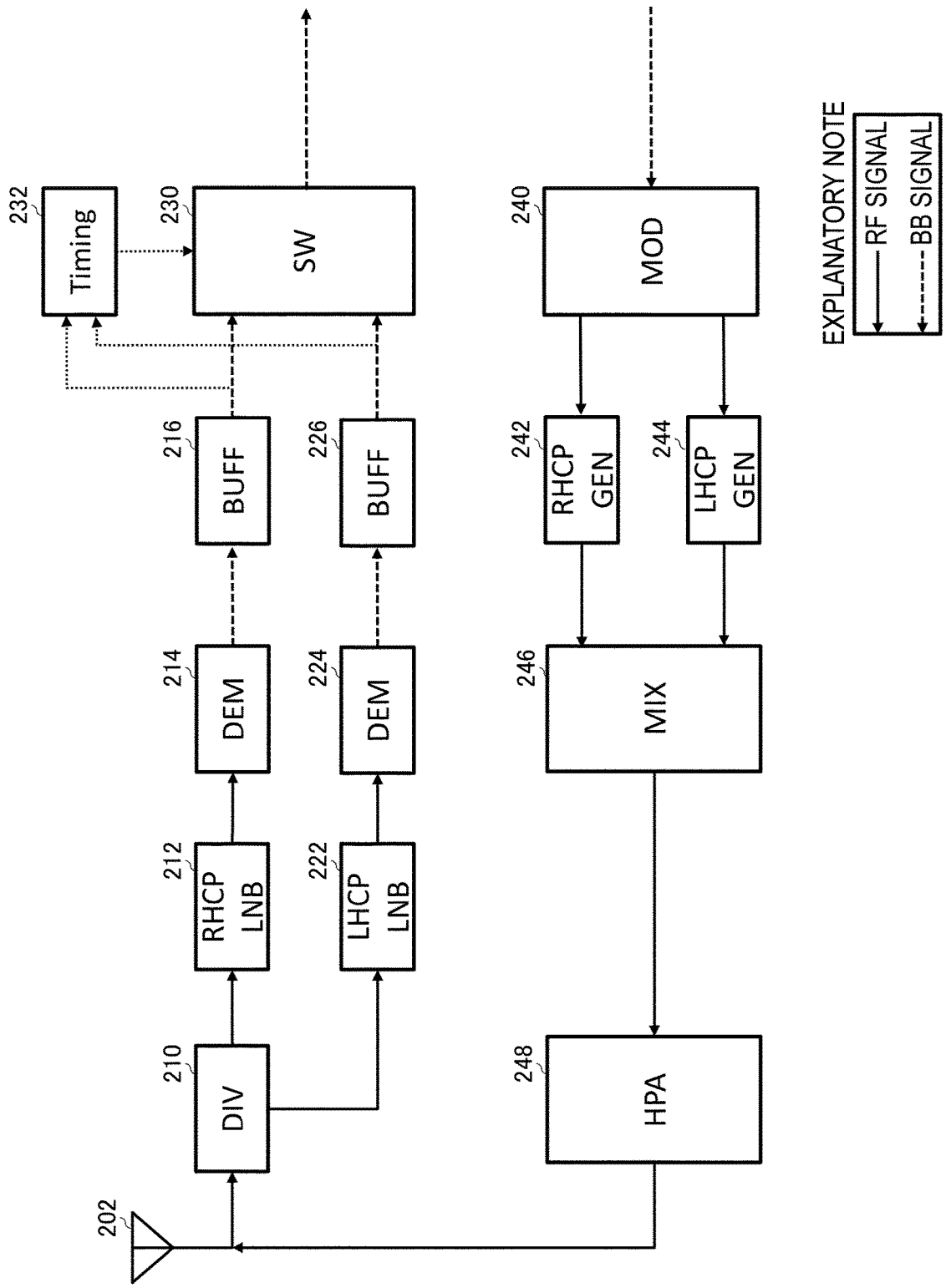
FIG. 4 schematically illustrates an example of a configuration of a wireless communication unit 204.

FIG. 4 schematically illustrates an example of a configuration of the wireless communication unit 204. The wireless communication unit 204 includes a DIV (Distributor) 210, an RHCP LNB (Right-Hand Circularly Polarized Low Noise Block) 212, a DEM (Demodulator) 214, a BUFF (Buffer) 216, an LHCP LNB (Left-Hand Circularly Polarized Low Noise Block) 222, a DEM 224, a BUFF 226, an SW (Switch) 230, a Timing 232, a MOD (Modulator) 240, an RHCP GEN (Right-Hand Circularly Polarized Generator) 242, an LHCP GEN (Left-Hand Circularly Polarized Generator) 244, a MIX 246, and an HPA (High Power Amp) 248.

The DIV 210 is a distributor. The DIV 210 distributes RF signals received by the antenna 202 to the RHCP LNB 212 and the LHCP LNB 222.

The RHCP LNB 212 is a low noise block for the right-handed circularly polarized wave. The DEM 214 is a demodulator. The DEM 214 demodulates an RF (Radio Frequency) signal that has passed through the RHCP LNB 212. The BUFF 216 may be an example of a first buffer. The BUFF 216 temporarily stores a BB (BaseBand) signal demodulated by the DEM 214.

The LHCP LNB 222 is a low noise block for the left-handed circularly polarized wave. The DEM 224 is a demodulator. The DEM 224 demodulates an RF signal that has passed through the LHCP LNB 212. The BUFF 226 may be an example of a second buffer. The BUFF 226 temporarily stores a BB signal demodulated by the DEM 224.

The SW 230 is a switch and is connected to the BUFF 216 and the BUFF 226. The Timing 232 is a timing circuit. The communication control unit 206 controls the SW 230 and the Timing 232 to adjust timings and make a switch between the BB signal from the BUFF 216 and the BB signal from the BUFF 226. For example, when a signal is received from the first HAPS 100 as the active aircraft using the right-handed circularly polarized wave and a signal is received from the second HAPS 100 as the spare aircraft using the left-handed circularly polarized wave, a switch is made from the BB signal from the BUFF 216 to the BB signal from the BUFF 226. When there are no BUFF 216 and BUFF 226, the BB signals may partially be lost during switching, but by providing the BUFF 216 and the BUFF 226, uninterrupted switching can be realized.

The MOD 240 is a modulator. The MOD 240 modulates a BB signal of signals to be transmitted to the HAPS 100, and outputs an RF signal. The MOD 240 outputs the BB signal to be transmitted using the right-handed circularly polarized wave to the RHCP GEN 242, and outputs the BB signal to be transmitted using the left-handed circularly polarized wave to the LHCP GEN 244. For example, the RF signal to be transmitted to the first HAPS 100 as the active aircraft is output to the RHCP GEN 242, and the RF signal to be transmitted to the second HAPS 100 as the spare aircraft is output to the LHCP GEN 244.

The RHCP GEN 242 is a generator that generates a right-handed circularly polarized wave including the RF signal received from the MOD 240. The LHCP GEN 244 is a generator that generates a left-handed circularly polarized wave including the RF signal received from the MOD 240.

The MIX 246 is a synthesizer. The MIX 246 synthesizes the right-handed circularly polarized wave generated by the RHCP GEN 242 and the left-handed circularly polarized wave generated by the LHCP GEN 244.

The HPA 248 is a high power amplifier. The HPA 248 amplifies both of the circularly polarized waves synthesized by the MIX 246 and outputs the resultant to the antenna 202.

Figure 5:
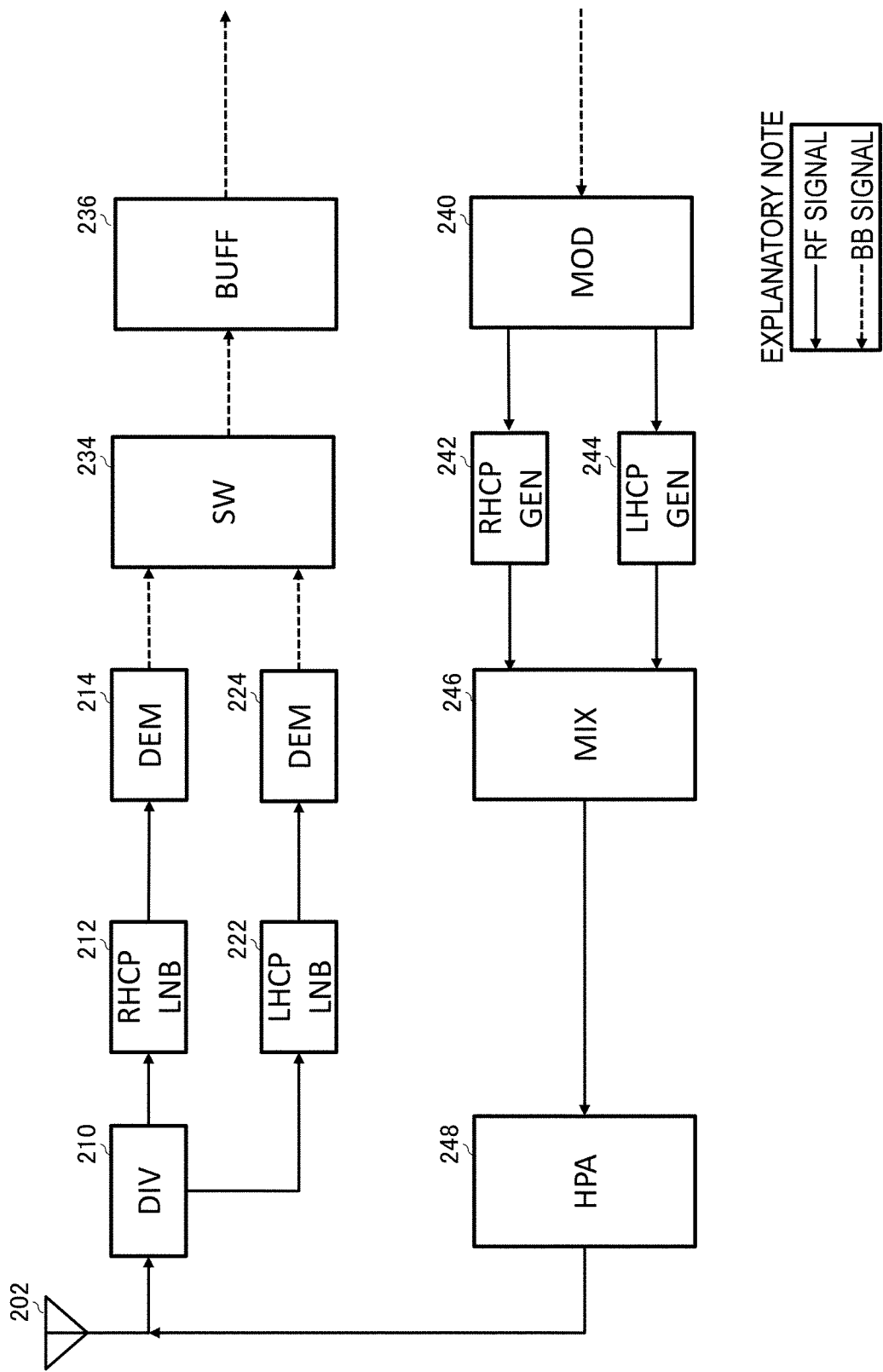
FIG. 5 schematically illustrates an example of the configuration of the wireless communication unit 204.

FIG. 5 schematically illustrates an example of the configuration of the wireless communication unit 204. Here, differences from FIG. 4 will mainly be described. The wireless communication unit 204 includes the DIV 210, the RHCP LNB 212, the DEM 214, the LHCP LNB 222, the DEM 224, an SW 234, the BUFF 236, the MOD 240, the RHCP GEN 242, the LHCP GEN 244, the MIX 246, and the HPA 248.

The SW 234 is connected to the DEM 214 and the DEM 224. The BUFF 236 is connected to the SW 234. In the wireless communication unit 204 shown in FIG. 5, the BB signals subjected to the demodulation by the DEM 214 and the DEM 224 are switched by the SW 234 and accumulated in the BUFF 236. For example, when a signal is received from the first HAPS 100 as the active aircraft using the right-handed circularly polarized wave and a signal is received from the second HAPS 100 as the spare aircraft using the left-handed circularly polarized wave, the communication control unit 206 makes a switch from the BB signal from the DEM 214 to the BB signal from the DEM 224, and adjusts the switching by the BB signals stored in the BUFF 236. When there is no BUFF 236, the BB signals may partially be lost during switching, but by providing the BUFF 236, uninterrupted switching can be realized.

Figure 6:
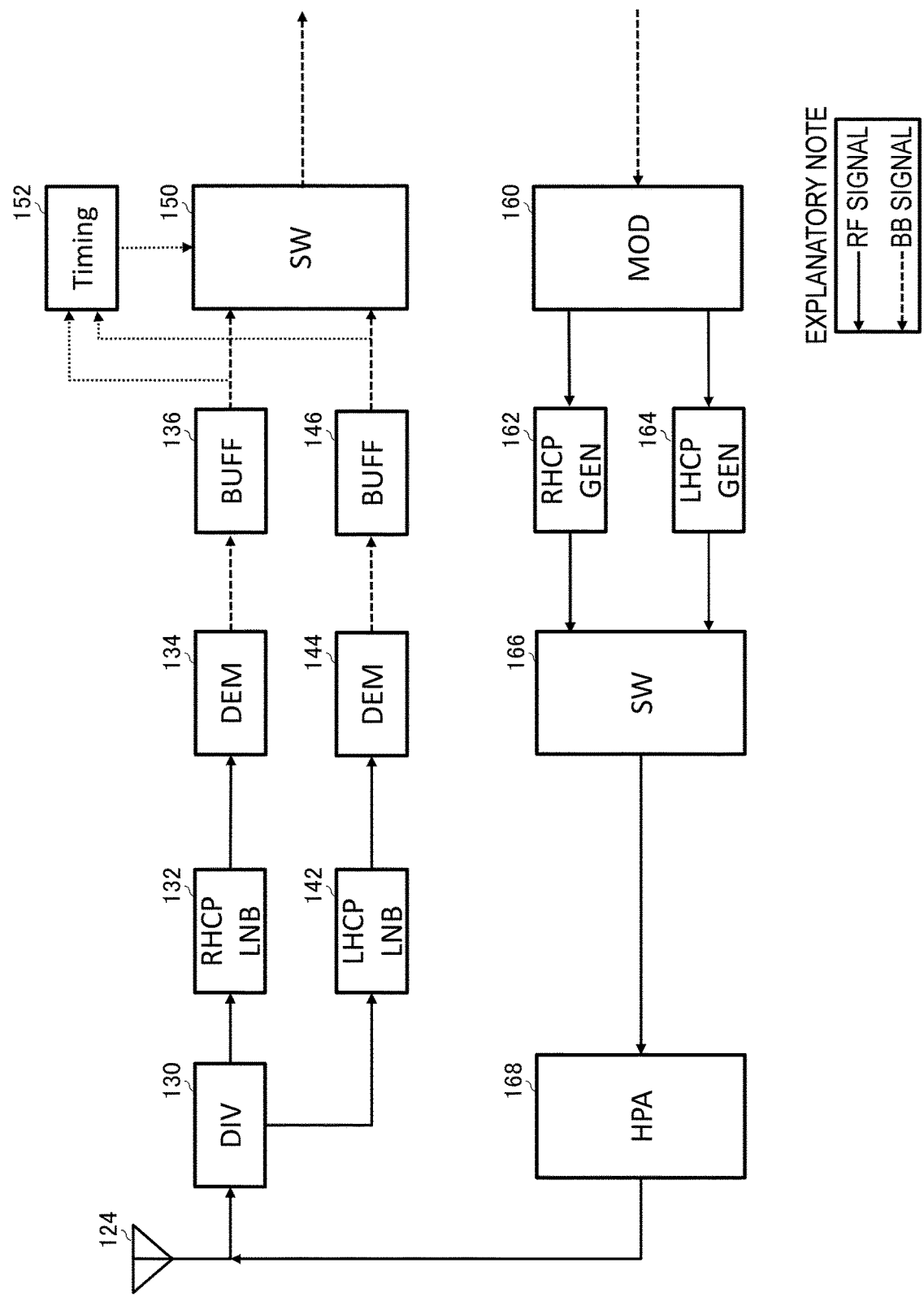
FIG. 6 schematically illustrates an example of a configuration of a wireless communication unit of a communication control device 120.

FIG. 6 schematically illustrates an example of a configuration of the wireless communication unit 121. The wireless communication unit 121 includes a DIV 130, an RHCP LNB 132, a DEM 134, a BUFF 136, an LHCP LNB 142, a DEM 144, a BUFF 146, an SW 150, a Timing 152, a MOD 160, an RHCP GEN 162, an LHCP GEN 164, an SW 166, and an HPA 168.

The DIV 130 is a distributor. The DIV 130 distributes RF signals received by the FL antenna 124 to the RHCP LNB 132 and the LHCP LNB 142.

The RHCP LNB 132 is a low noise block for the right-handed circularly polarized wave. The DEM 134 is a demodulator. The DEM 134 demodulates an RF signal that has passed through the RHCP LNB 132. The BUFF 136 is a buffer. The BUFF 136 temporarily stores a BB signal demodulated by the DEM 134.

The LHCP LNB 142 is a low noise block for the left-handed circularly polarized wave. The DEM 144 is a demodulator. The DEM 144 demodulates an RF signal that has passed through the LHCP LNB 142. The BUFF 146 is a buffer. The BUFF 146 temporarily stores the BB signal demodulated by the DEM 144.

The SW 150 is a switch and is connected to the BUFF 136 and the BUFF 146. The Timing 152 is a timing circuit. The communication control unit 122 may control the SW 150 and the Timing 152 to adjust timings and make a switch between the BB signal from the BUFF 136 and the BB signal from the BUFF 146.

The MOD 160 is a modulator. The MOD 160 modulates a BB signal of signals to be transmitted to the ground communication device 200 and outputs an RF signal. The MOD 160 outputs the BB signal to be transmitted using the right-handed circularly polarized wave to the RHCP GEN 162, and outputs the BB signal to be transmitted using the left-handed circularly polarized wave to the LHCP GEN 164.

The RHCP GEN 162 is a generator that generates a right-handed circularly polarized wave including the RF signal received from the MOD 160. The LHCP GEN 164 is a generator that generates a left-handed circularly polarized wave including the RF signal received from the MOD 160.

The SW 166 makes a switch between the right-handed circularly polarized wave generated by the RHCP GEN 162 and the left-handed circularly polarized wave generated by the LHCP GEN 164, and outputs the circularly polarized wave to the HPA 168. The HPA 168 is a high power amplifier. The HPA 168 amplifies the right-handed circularly polarized wave or the left-handed circularly polarized wave output by the SW 166, and outputs the resultant to the antenna 124.

FIG. 6 exemplifies the case of including the RHCP GEN 162, the LHCP GEN 164, and the SW 166, but the present invention is not limited to this. The wireless communication unit 121 may alternatively include a single generator capable of generating each of the right-handed circularly polarized wave and the left-handed circularly polarized wave in place of the RHCP GEN 162, the LHCP GEN 164, and the SW 166. In addition, the wireless communication unit 121 may include a MIX in place of the SW 166. Accordingly, double-polarized transmissions become possible.

Figure 7:
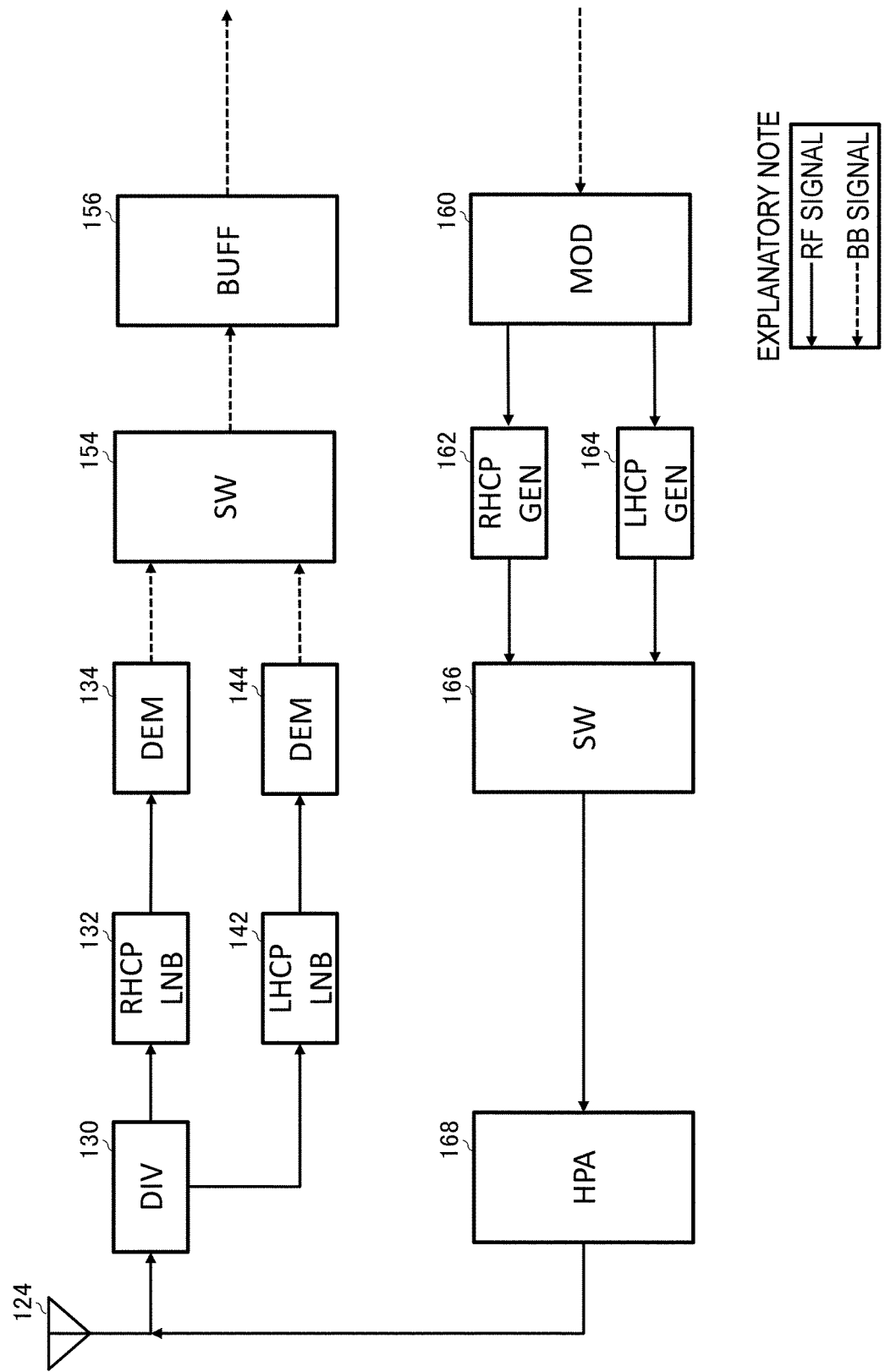
FIG. 7 schematically illustrates an example of the configuration of the wireless communication unit of the communication control device 120.

FIG. 7 schematically illustrates an example of the configuration of the wireless communication unit 121. Here, differences from FIG. 6 will mainly be described. The wireless communication unit 121 includes the DIV 130, the RHCP LNB 132, the DEM 134, the LHCP LNB 142, the DEM 144, an SW 154, a BUFF 156, the MOD 160, the RHCP GEN 162, the LHCP GEN 164, the SW 166, and the HPA 168.

The SW 154 is connected to the DEM 134 and the DEM 144. The BUFF 156 is connected to the SW 154. In the wireless communication unit 121 shown in FIG. 7, BB signals subjected to the demodulation by the DEM 134 and the DEM 144 are switched by the SW 154 and accumulated in the BUFF 156.

Figure 8:
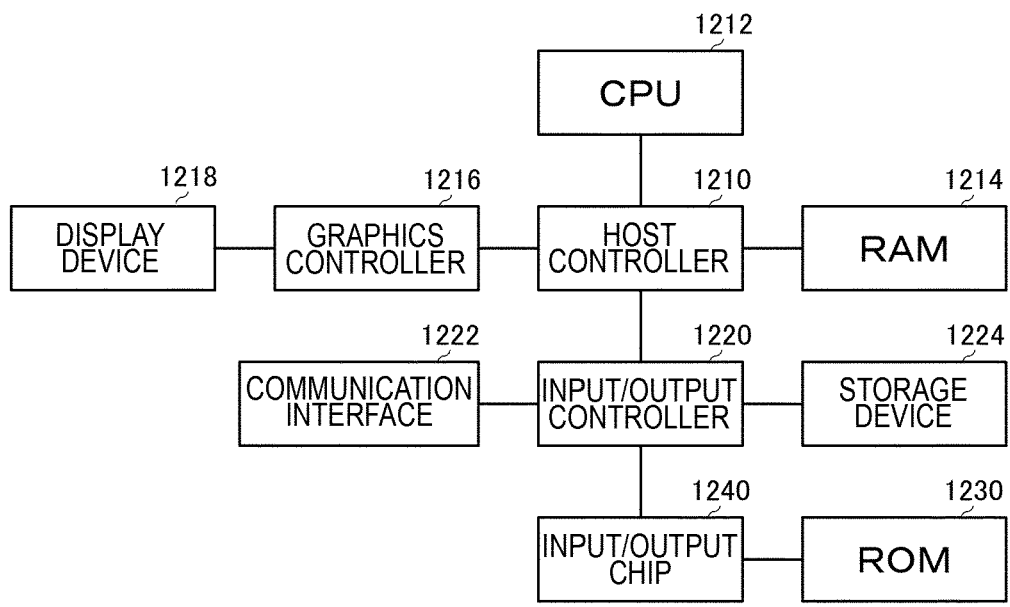
FIG. 8 schematically illustrates an example of a hardware configuration of a computer 1200 that functions as the communication control device 120 or a ground communication device 200.

FIG. 8 schematically illustrates an example of a hardware configuration of a computer 1200 that functions as the communication control device 120 or the ground communication device 200. Programs installed in the computer 1200 can cause the computer 1200 to function as one or more "units" of the device according to the present embodiment or can cause the computer 1200 to execute operations associated with the devices according to the present embodiment or the one or more "units", and/or can cause the computer 1200 to execute a process according to the present embodiment or steps of the process. Such a program may be executed by a CPU 1212 to cause the computer 1200 to perform specific operations associated with some or all of the blocks in the flowcharts and block diagrams described in the present specification.

The computer 1200 according to the present embodiment includes the CPU 1212, a RAM 1214, and a graphics controller 1216, which are connected to each other via a host controller 1210. Also, the computer 1200 includes input/output units such as a communication interface 1222, a storage device 1224, a DVD drive, and an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from the IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units to the input/output controller 1220 via a USB port, a parallel port, a serial port, a keyboard port, a mouse port, or the like.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where communication is performed between the computer 1200 and an external device, the CPU 1212 may execute a communication program loaded in the RAM 1214 and instruct the communication interface 1222 to perform communication processing based on processing written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), and the IC card, and perform various types of processing on the data on the RAM 1214. Then, the CPU 1212 may write the processed data back in the external recording medium.

Various types of programs, data, table, and various types of information such as a database may be stored in a recording medium to receive information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, and writes the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying the predetermined condition.

The programs or software module described above may be stored in a computer-readable storage medium on the computer 1200 or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in the flowcharts and block diagrams in the present embodiment may represent steps of processes in which operations are performed or "units" of devices responsible for performing operations. A specific step and "unit" may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and other logical operations, and a flip-flop, a register, and a memory element, such as a field programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means to perform an operation specified by a flowchart or a block diagram. Examples of the computer-readable storage medium may include an electronic storage medium, a magnetic storage medium, an optical storage medium, an electromagnetic storage medium, a semiconductor storage medium, or the like. More specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

The computer-readable instruction may include an assembler instruction, an instruction-set-architecture (ISA) instruction, a machine instruction, a machine dependent instruction, a microcode, a firmware instruction, state-setting data, or either source code or object code written in any combination of one or more programming languages including an object oriented programming language such as Smalltalk (registered trademark), JAVA (registered trademark), and C++, and a conventional procedural programming language such as a "C" programming language or a similar programming language.

The computer-readable instruction may be provided to a general-purpose computer, a special-purpose computer, or a processor or a programmable circuit of another programmable data processing device locally or via a local area network (LAN) or a wide area network (WAN) such as the Internet in order that the general-purpose computer, the special-purpose computer, or the processor or the programmable circuit of another programmable data processing device is to perform the computer-readable instruction to provide means to perform operations specified by the flowchart or the block diagram. Examples of the processor include a computer processor, a processing unit, a microprocessor, a digital signal processor, a controller, a microcontroller, and the like.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: network; 30: user terminal; 100: HAPS; 102: fuselage; 104: central part; 106: propeller; 108: pod; 109: solar panel; 110: flight control device; 120: communication control device; 121: wireless communication unit; 122: communication control unit; 123: SL antenna; 124: FL antenna; 126: beam; 128: communication area; 130: DIV; 132: RHCP LNB; 134: DEM; 136: BUFF; 142: LHCP LNB; 144: DEM; 146: BUFF; 150: SW; 152: Timing; 154: SW; 156: BUFF; 160: MOD; 162: RHCP GEN; 164: LHCP GEN; 166: SW; 168: HPA; 200: ground communication device; 202: antenna; 204: wireless communication unit; 206: communication control unit; 210: DIV; 212: RHCP LNB; 214: DEM; 216: BUFF; 222: LHCP LNB; 224: DEM; 226: BUFF; 230: SW; 232: Timing; 234: SW; 236: BUFF;

240: MOD; 242: RHCP GEN; 244: LHCP GEN; 246: MIX; 248: HPA; 310: right-handed circularly polarized wave; 320: left-handed circularly polarized wave; 400: management device; 500: allocated frequency; 1200: computer; 1210: host controller; 1212: CPU; 1214: RAM; 1216: graphics controller; 1218: display device; 1220: input/output controller; 1222: communication interface; 1224: storage device; 1230: ROM; 1240: input/output chip

What is claimed is:

1. A system, comprising:
   a first flying object and a second flying object each configured to be capable of establishing a wireless communication link with a ground communication device arranged on ground,
   wherein, when replacing the first flying object which has established a wireless communication link with the ground communication device using a first circularly polarized wave with the second flying object, the first flying object cuts the wireless communication link with the ground communication device after the second flying object has established a wireless communication link with the ground communication device using a second circularly polarized wave opposite to the first circularly polarized wave.

2. The system according to claim 1, wherein the first circularly polarized wave is one of a right-handed circularly polarized wave or a left-handed circularly polarized wave, and the second circularly polarized wave is another one of the right-handed circularly polarized wave or the left-handed circularly polarized wave.

3. The system according to claim 1, wherein when replacing the first flying object with the second flying object, the ground communication device is configured to transmit information with respect to the first flying object using the first circularly polarized wave, and transmit information with respect to the second flying object using the second circularly polarized wave,
   the first flying object is configured to receive the first circularly polarized wave and the second circularly polarized wave transmitted by the ground communication device, to acquire the information with respect to the first flying object, and
   the second flying object is configured to receive the first circularly polarized wave and the second circularly polarized wave transmitted by the ground communication device, to acquire the information with respect to the second flying object.

4. The system according to claim 2, wherein when replacing the first flying object with the second flying object, the ground communication device is configured to transmit information with respect to the first flying object using the first circularly polarized wave, and transmit information with respect to the second flying object using the second circularly polarized wave,
   the first flying object is configured to receive the first circularly polarized wave and the second circularly polarized wave transmitted by the ground communication device, to acquire the information with respect to the first flying object, and
   the second flying object is configured to receive the first circularly polarized wave and the second circularly polarized wave transmitted by the ground communication device, to acquire the information with respect to the second flying object.

5. The system according to claim 1, further comprising: the ground communication device,
   wherein, when replacing the first flying object with the second flying object, the ground communication device is configured to receive the first circularly polarized wave transmitted by the first flying object and the second circularly polarized wave transmitted by the second flying object, to acquire information from the first flying object and information from the second flying object.

6. The system according to claim 2, further comprising: the ground communication device,
   wherein, when replacing the first flying object with the second flying object, the ground communication device is configured to receive the first circularly polarized wave transmitted by the first flying object and the second circularly polarized wave transmitted by the second flying object, to acquire information from the first flying object and information from the second flying object.

7. The system according to claim 5, wherein the ground communication device includes a first buffer configured to accumulate a first baseband signal obtained by demodulating the first circularly polarized wave, a second buffer configured to accumulate a second baseband signal obtained by demodulating the second circularly polarized wave, and a switch connected to the first buffer and the second buffer.

8. The system according to claim 5, wherein the ground communication device includes a switch configured to accumulate, in a buffer, a first baseband signal obtained by demodulating the first circularly polarized wave and a second baseband signal obtained by demodulating the second circularly polarized wave while making a switch between the first baseband signal and the second baseband signal.

9. The system according to claim 1, wherein each of the first flying object and the second flying object includes a feeder link antenna for communicating with the ground communication device, and a service link antenna for forming, by irradiating beams toward a target area on the ground, a wireless communication area in the target area, and
   the second flying object is configured to replace the first flying object in forming the wireless communication area in the target area.

10. The system according to claim 2, wherein each of the first flying object and the second flying object includes a feeder link antenna for communicating with the ground communication device, and a service link antenna for forming, by irradiating beams toward a target area on the ground, a wireless communication area in the target area, and
    the second flying object is configured to replace the first flying object in forming the wireless communication area in the target area.

11. The system according to claim 9, wherein the first flying object is configured to form the wireless communication area in the target area while circling in a sky above the target area, and
    the second flying object is configured to establish the wireless communication link with the ground communication device using the second circularly polarized wave while flying in a flight area corresponding to a flight area of the first flying object.

12. A communication device arranged on ground, comprising:
- a wireless communication unit configured to be capable of establishing a wireless communication link with a first flying object and a second flying object; and
- a control unit configured to control the wireless communication unit to, when replacing the first flying object which has established a wireless communication link using a first circularly polarized wave with the second flying object, receive the first circularly polarized wave transmitted by the first flying object and a second circularly polarized wave transmitted by the second flying object, which is opposite to the first circularly polarized wave, to acquire information from the first flying object and information from the second flying object, and cut the wireless communication link with the first flying object after establishing a wireless communication link with the second flying object.

13. A communication device mounted on a flying object, comprising:
- a wireless communication unit configured to wirelessly communicate with a ground communication device arranged on ground; and
- a communication control unit configured to cause the wireless communication unit to make a switch between double-polarized communication which uses a right-handed circularly polarized wave and a left-handed circularly polarized wave and single-polarized communication which uses the right-handed circularly polarized wave or the left-handed circularly polarized wave, according to a predetermined condition.

14. The communication device according to claim 13, wherein
the flying object is configured to fly using electrical power of a battery, and
the communication control unit is configured to make the switch between the double-polarized communication and the single-polarized communication based on a remaining battery amount of the battery.

15. The communication device according to claim 13, wherein
the flying object is configured to fly using electrical power of a battery, and
the communication control unit is configured to make the switch between the double-polarized communication and the single-polarized communication based on power consumption of the battery.

16. The communication device according to claim 13, wherein
the flying object includes a solar panel, and
the communication control unit is configured to make the switch between the double-polarized communication and the single-polarized communication based on a generated electrical power amount of the solar panel.

17. The communication device according to claim 13, wherein
the flying object includes a feeder link antenna for communicating with the ground communication device, and a service link antenna for forming, by irradiating beams toward a target area on the ground, a wireless communication area in the target area,
the wireless communication unit is configured to provide a wireless communication service to a user terminal in the wireless communication area formed by using the service link antenna, and
the communication control unit is configured to make the switch between the double-polarized communication and the single-polarized communication based on a communication traffic volume of the user terminal in the wireless communication area.

18. A program for causing a computer to function as the communication device according to claim 12.

19. A control method executed by a computer arranged on ground, comprising:
controlling to, when replacing a first flying object which has established a wireless communication link using a first circularly polarized wave with a second flying object, receive the first circularly polarized wave transmitted by the first flying object and a second circularly polarized wave transmitted by the second flying object, which is opposite to the first circularly polarized wave, to acquire information from the first flying object and information from the second flying object, and cut the wireless communication link with the first flying object after establishing a wireless communication link with the second flying object.

20. A control method executed by a computer mounted on a flying object, comprising:
controlling to cause a wireless communication system for wirelessly communicating with a ground communication device arranged on ground to be switched between double-polarized communication which uses a right-handed circularly polarized wave and a left-handed circularly polarized wave and single-polarized communication which uses the right-handed circularly polarized wave or the left-handed circularly polarized wave, according to a predetermined condition.

\* \* \* \* \*